US006181705B1

(12) United States Patent
Branstad et al.

(10) Patent No.: US 6,181,705 B1
(45) Date of Patent: Jan. 30, 2001

(54) SYSTEM AND METHOD FOR MANAGEMENT A COMMUNICATIONS BUFFER

(75) Inventors: Mark William Branstad; Brad Louis Brech; Jonathan William Byrn; Gary Scott Delp, all of Rochester, MN (US); Rafael M. Montalvo, Yorktown Heights, NY (US)

(73) Assignee: International Business Machines Corporation, Armonk, NY (US)

( * ) Notice: Under 35 U.S.C. 154(b), the term of this patent shall be extended for 0 days.

(21) Appl. No.: 08/691,803

(22) Filed: Aug. 14, 1996

Related U.S. Application Data

(63) Continuation of application No. 08/171,050, filed on Dec. 21, 1993, now abandoned.

(51) Int. Cl.[7] .............................. H04L 13/08; H04L 12/56
(52) U.S. Cl. ........................ 370/412; 370/429; 711/171
(58) Field of Search ................................... 370/252, 412, 370/428, 429, 465; 340/825.5, 825.51, 825.52; 711/147, 148, 153, 170, 171, 172, 173; 710/52, 56

(56) References Cited

U.S. PATENT DOCUMENTS

| 4,788,679 | 11/1988 | Kataoka et al. ..................... 370/60 |
| 4,933,932 | * 6/1990 | Quinguis et al. .................. 370/94.1 |
| 4,953,157 | * 8/1990 | Franlilin et al. .................. 370/94.1 |
| 4,962,497 | 10/1990 | Ferenc et al. ..................... 370/60.1 |
| 4,991,172 | 2/1991 | Cidon et al. ..................... 370/94.1 |
| 4,993,025 | 2/1991 | Vesel et al. ...................... 370/94.1 |
| 5,126,999 | 6/1992 | Munter et al. ..................... 370/60 |
| 5,233,606 | * 8/1993 | Pasham et al. .................... 370/94.1 |
| 5,301,192 | * 4/1994 | Henrion .......................... 370/94.1 |
| 5,416,769 | * 5/1995 | Karol ............................. 370/94.1 |

FOREIGN PATENT DOCUMENTS

| 3203442 | 9/1991 | (JP) ............................ 13/8 |
| 4192743 | 7/1992 | (JP) ............................ 13/8 |
| 4237238 | 8/1992 | (JP) ............................ 13/8 |

* cited by examiner

Primary Examiner—Ricky Ngo
(74) Attorney, Agent, or Firm—Felsman, Bradley, Vaden, Gunter & Dillon, LLP

(57) ABSTRACT

A network buffer memory is divided into pools of locations including a plurality of tinygram contiguous sections and a plurality of jumbogram contiguous sections. The tinygram contiguous sections available for storage of packets are listed in a list of tinygram pointers. The jumbogram contiguous sections available for storage of packets are also listed in a list of jumbogram pointers. A threshold for distinguishing the packets as tinygrams and jumbograms is programmed. As packets are received, they are measured against the threshold. Responsive to detection of an end of packet condition prior to reaching the threshold, storing the packet in a tinygram contiguous section. Otherwise, the packet is stored in a jumbogram contiguous section. Availability of sections is determined by query to the FIFO lists of pointers.

17 Claims, 5 Drawing Sheets

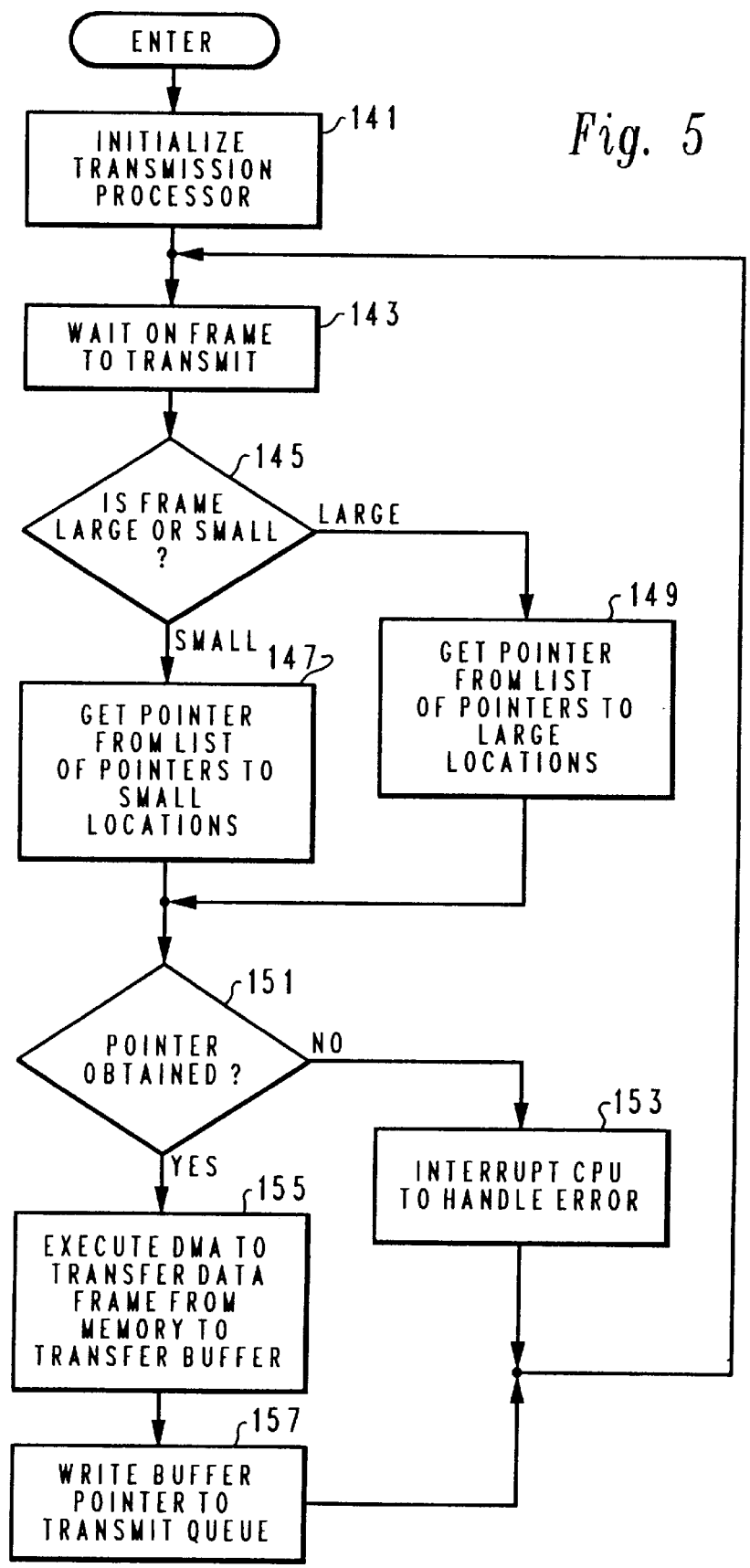

SYSTEM AND METHOD FOR MANAGEMENT A COMMUNICATIONS BUFFER

This application is a continuation of Ser. No. 08/171,050, filed Dec. 21, 1993, now abandoned.

BACKGROUND OF THE INVENTION

1. Technical Field

The invention relates to distributed data processing systems and more particularly to management of a buffer for a network adaptor receiving and/or transmitting data packets for a node of a distributed data processing system.

2. Description of the Related Art

The passing of data between a communications link and a node comprising a computer or terminal is commonly supported by buffering the data. The object of buffering is to avoid rigid synchronization in operation of the communications link and the internal operations of the node. A buffer may be implemented using memory or data storage registers, a disk drive, a delay line, or any one of a number of technologies. Use of a buffer allows for differences in the rate of flow of information or time of occurrence of events when transmitting information between the communications link and node.

The organization of data for transmission over a communications link has a number of consequences relating to efficient use of the communications link, management of transmission and receipt of the data, efficient use of memory upon receipt of the data, among other things. For example, a common way of handling organization of data is the use of packets, in which control and data elements are switched and transmitted as a composite whole. The use of packets simplifies a number of issues concerning routing.

Packets, or other types of data frames, may be variable in length. This has an advantage over fixed length frames in terms of efficient utilization of a communications link throughput capacity. The allocation of space in a buffer for the creation, transmission, copying and manipulation of variable length frames can, however, consume a considerable portion of the processing power of a node if the task is implemented in sequential software. The computation and construction of direct memory access (DMA) control blocks is a major part of the problem.

One way to reduce the computational load imposed on a receiving node by the use of variable length frames is to receive the frames into buffer locations of fixed length, which allow for any possible size of frame, including headers which may be added to the frame after the bulk data copy. A problem with this approach is that requires use of a great deal of memory to implement because of internal fragmentation of the buffer.

Buffer location chaining has also been used as an approach to the problem. However, doing so requires construction of descriptions of the chains and the need to allocate memory bandwidth for the reading of the chains.

Also known is the use of a first-in, first-out (FIFO) receive buffer where only so much location as is needed for a packet/frame is used. This approach suffers from the complication of a need for clearing memory. When a memory location is released, all of the frames preceding the released frame in time must also be released before the particular location may be reused.

SUMMARY OF THE INVENTION

It is an object of the present invention to provide a system and method for the management of a buffer for a network adaptor receiving data packets for a node in a distributed data processing system.

It is another object of the present invention to provide for a system and method for segregating data frames into two classes for managing buffer space.

The above and other objects of the invention are provided for by a network adaptor for implementing method of managing communication data. A network adaptor buffer memory is divided into pools including a plurality of tinygram contiguous sections and a plurality of jumbogram contiguous sections. The tinygram contiguous sections available for storage of packets are indicated by a list of pointers to the available tinygram contiguous sections. The jumbogram contiguous sections available for storage of packets are also indicated by a list of pointers to the available jumbogram contiguous sections. A threshold for distinguishing the packets as tinygrams and jumbograms is selected. Then, as packets are received, they are measured against the threshold. Responsive to detection of an end of packet condition prior to reaching the threshold, the packet is stored in a tinygram contiguous section. Otherwise, the packet is stored in a jumbogram contiguous section. The availability of sections is determined by query to the FIFO lists of pointers.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a logical flow chart of a process for setting up transmission of packets in accordance with the invention.

DETAILED DESCRIPTION OF THE INVENTION

Figure 1:
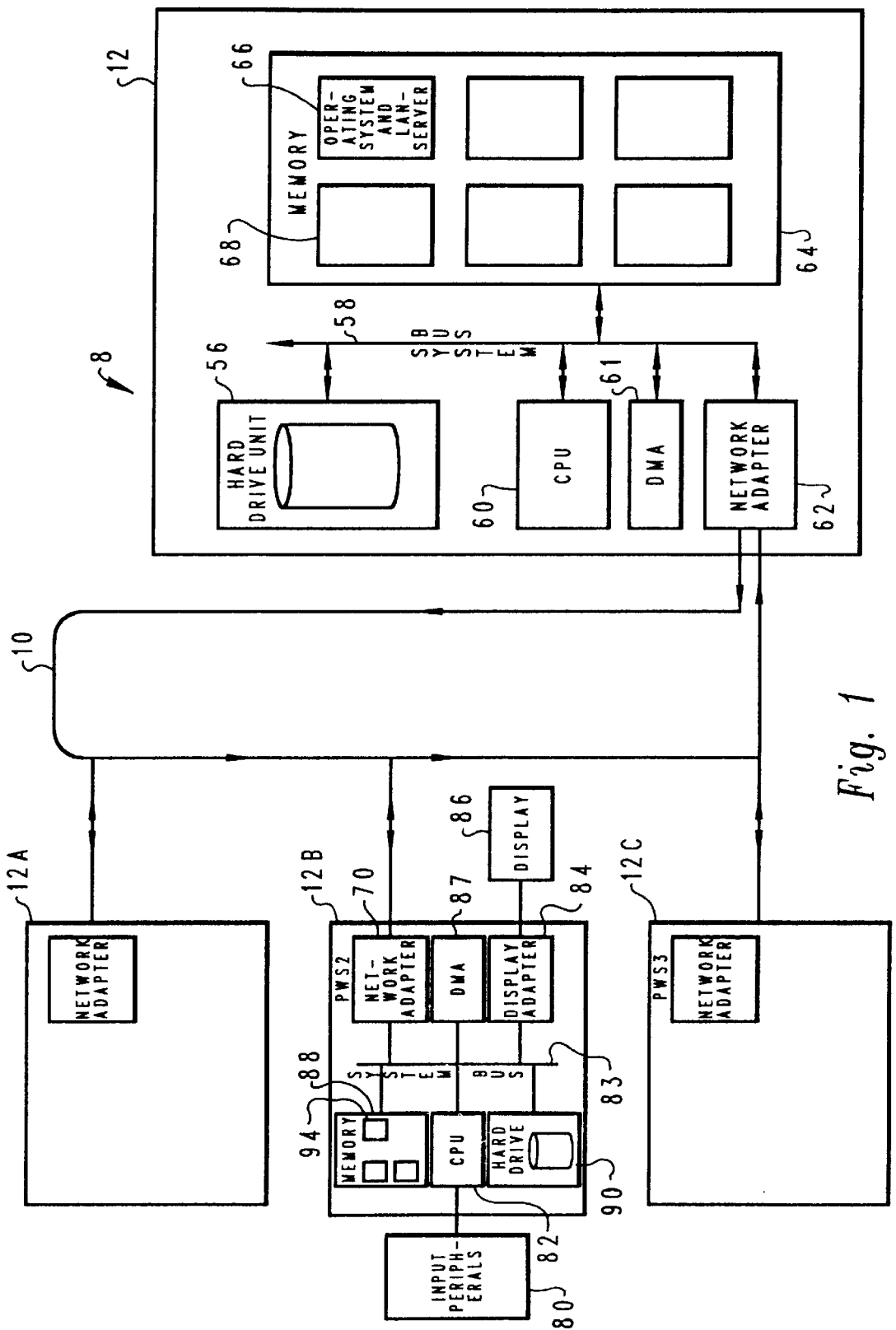
FIG. 1 is a block diagram of a token ring network interconnecting a plurality of nodes.

FIG. 1 depicts a block diagram of an illustrative local area network 8 for supporting transmittal of data including file server and multimedia data between a plurality of nodes. Local area network 8 is depicted in a token ring geometry, however other geometries are possible. Server 12 communicates with computers 12A–12C over a communications channel 10. Server 12 is a conventional computer such as an IBM Personal System/2 or AS/400 system programmed to practice this invention, and includes a central processing unit 60, a memory 64, and a network adapter 62 for buffering outgoing and incoming transmissions of data frames or packets. Server 12 includes a hard drive unit 56 storing a plurality of multimedia and other data objects pending a request for access by one or more users. Such a request results in staging of the data object from hard drive unit 56 to computer memory 64 or network adaptor 62 over system bus 58. A number of objects exist within memory 64. An operating system and local area network server 66 are represented as one object. Objects stored on hard drive unit 64 and memory 64 to be transmitted must be organized into frames or packets and handed off to network adaptor 62. Similarly, data being received over ring 10 may be staged from network adaptor 62 for transfer to hard drive unit 56 or memory 64. CPU 60 can program a direct memory access (DMA) controller 61 to handle transfer of data over system bus 58 to and from network adaptor 62.

Users access data files stored on sever 12 through computers 12A–12C. Computer 12B is a typical example. A computer 12B operates as a personal workstation communicating with computer 12. Schematically the personal workstation 12B is substantially similar to server 12, and includes a network adapter 78, a display adapter 84, a hard drive unit 90, a central processing unit (CPU) 82 and an addressable memory 88. Components of personal workstation 12B transfer data internally over a system bus 83. CPU 82 directly controls input peripherals 80 which may include a keyboard and a mouse. Display adapter 84 drives a display device 86, upon which data from a file is visually presented. Memory 88 includes a command structure 94 for use in establishing a communications session on network 8. DMA controller 87 fulfills the same function in computer 12B as DMA controller 61 does in server 12.

Figure 2:
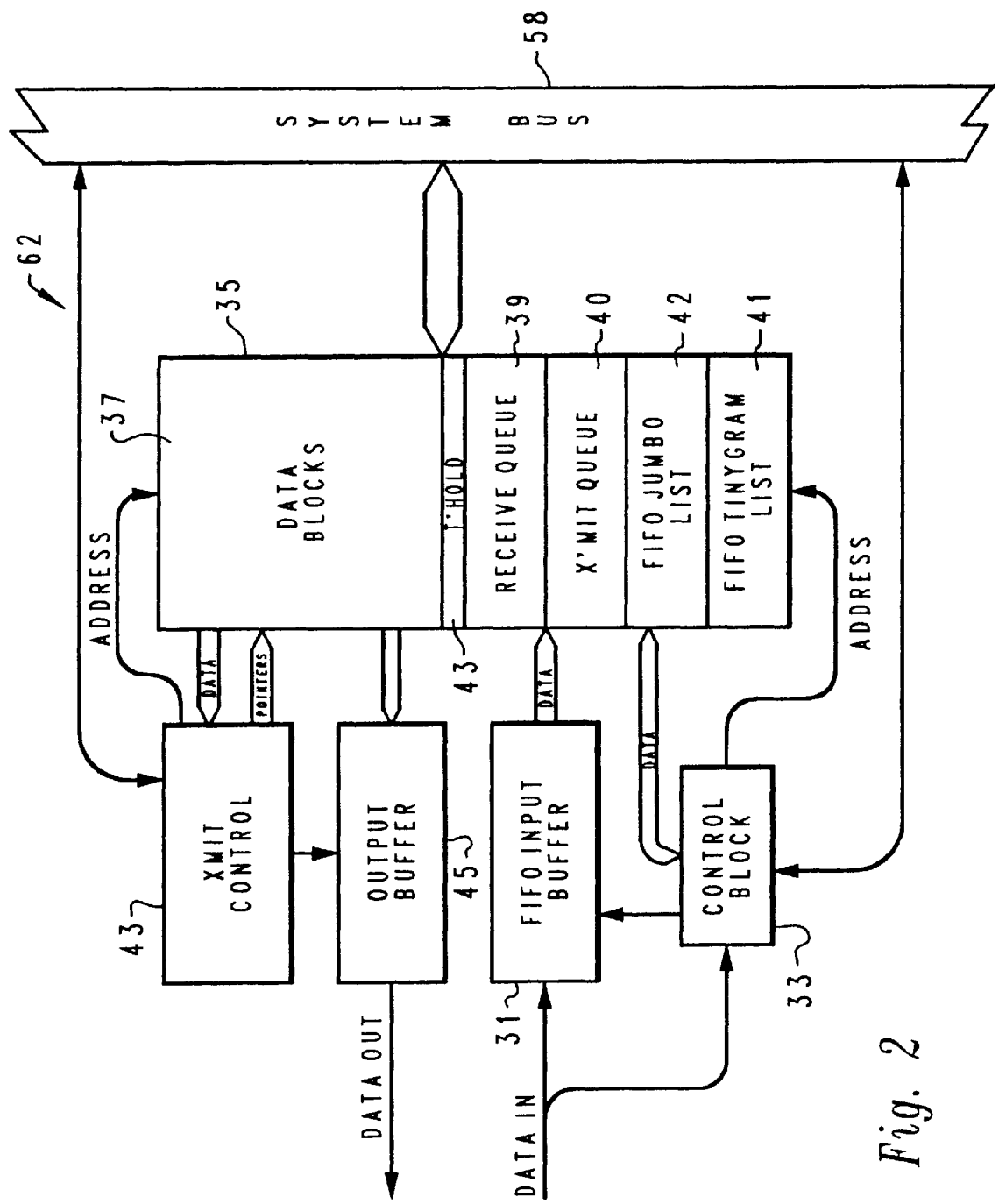
FIG. 2 is a block diagram of data flow within a network adaptor for use on the network of FIG. 1.

FIG. 2 is a block diagram of network adaptor 62. Data frames or packets are received on a First-In, First-Out input buffer 31. Concurrently, packets are provided as an input to control logic block 33, which tracks the size of a packet being received from framing information for the packet. A threshold 43 accessible by control logic block 33 in memory 35 is used for size categorization, i.e. if the packet meets or is bigger than the threshold the packet is deemed a jumbogram, otherwise it is a tinygram. The size category of an incoming packet is known when end of packet information is received or when the threshold is met, whichever comes first. At this point an appropriately sized section of memory 35 may be selected for the packet. Memory 35 is usually an array of Random Access Memory on the adaptor card, but may be part of System Memory 64.

Memory 35 includes a reserved area of data blocks 37 for receiving incoming packets. Data blocks 37 come in two sizes, one sized to take any packet smaller than the threshold and a second sized to take the largest expected size of packet. The threshold 43 is programmable and may be changed. Tinygram pointer list 41 and jumbogram pointer list 42 include pointers to all of the smaller and larger size of blocks available for receiving data, respectively. Pointer lists 41 and 42 are preferably implemented as First-In, First-Out lists. Alternatively, a chained link list of pointers may be used in a stack implementation. A FIFO is easier to debug and implement while a stack has greater versatility. Upon retrieving a pointer and completion of reception of the packet, control logic block 33 addresses memory device 35 using the pointer (and associated addresses) and enables FIFO input buffer 31 to write the packet to the locations associated with the pointer into memory device 35. The pointer is then placed into receive queue 39. The CPU for the node may then be interrupted or some other technique employed to advise an application that data has been received. After the data packet is released from memory device 35 the pointer is returned to the appropriate list, either tinygram pointer list 41 or jumbogram pointer list 42.

Although not required, transmission of data packets may also utilize the division of memory device 35 into jumbograms and tinygrams. In such a case a system CPU may obtain a pointer from lists 41 or 42 and supply the pointer to transmit control 43 through a transmit queue 40. After obtaining the pointer transmit control 43 asserts the pointer (and/or associated addresses) as an address to memory device 35 to write the contents of the associated locations into an output buffer 45 for transmission. The pointer is then returned to the appropriate list 41 or 42. Release of the pointer may be delayed until acknowledgement of successful reception is received from the destination node.

Figure 3:
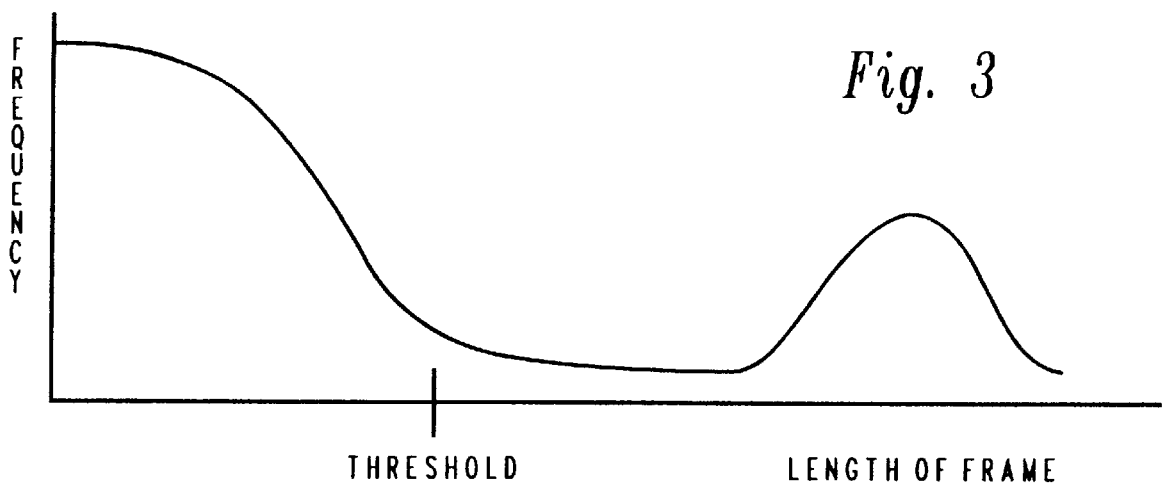
FIG. 3 is a graphical depiction of the frequency of occurrence length differentiated packets.

FIG. 3 is a graphical depiction of the frequency distribution by size of packets in a network, e.g. for multimedia data. The length of frame increases along the X-axis and the probability of occurrence increases along the Y-axis. Short packets, generally corresponding to requests, acknowledgements and control information are the predominant type of traffic. Longer packets correspond to multimedia data which peak in frequency at a much longer frame length. The distribution curve shows two peaks with an intervening trough in distribution. The tendency of multimedia data to exhibit such behavior makes division of a memory structure into two predetermined sizes of frames advantageous. If for some reason traffic tended to exhibit three pronounced frequency peaks, then utilizing three categories of presized contiguous sections of memory 35 might be advantageous.

Figure 4:
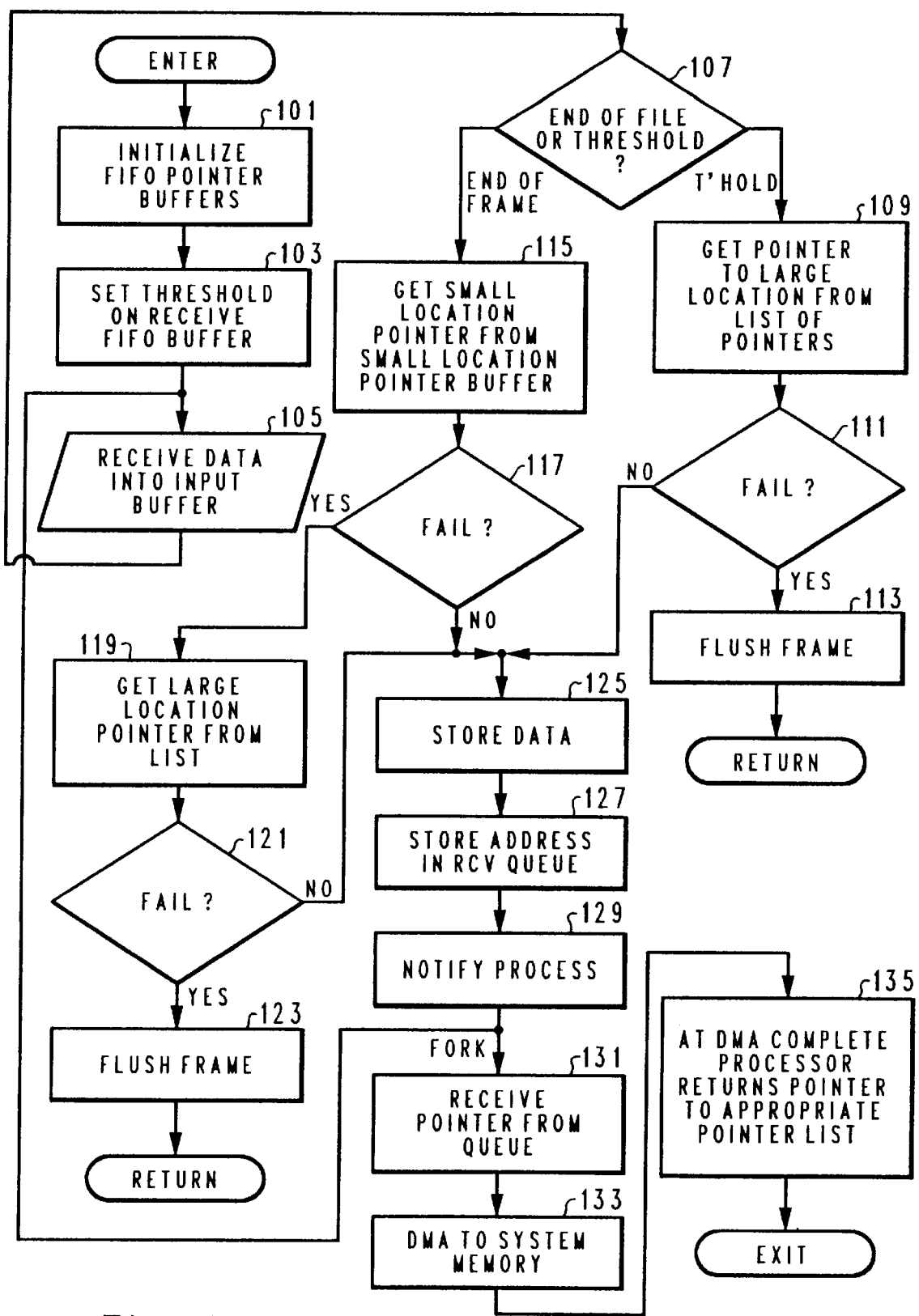
FIG. 4 is a logical flow chart of a packet reception process for implementing the invention.

FIG. 4 is a high level logical flow chart of a process for receiving data packets on network adaptor 62. Upon entry to the process on power up, the FIFO jumbogram list 42 and FIFO tinygram list are initialized at step 101. Initialization includes allocation of contiguous sections of memory 35 to function as tinygrams and jumbograms. The lowest address of the contiguous section may be used as a pointer. A section of memory may be reserved for identifying tinygrams and jumbograms by beginning location and type. Next, at step 103, a threshold is programmed for use in categorizing packets as either large or small.

At step 105, an incoming packet is received into an input buffer. Receipt of the packet is monitored and at step 107 it is determined if the packet has ended before the threshold condition is met or not. If the threshold is met or exceeded, step 109 follows step 107. At step 109, the process attempts to obtain a pointer to a jumbogram in memory device 35 from FIFO jumbogram list 42. At step 111 it is determined if a pointer was available. If none was, step 113 follows step 111 and the received frame is flushed. A failure acknowledgement may now be generated for return to the transmitting node on the network. The process is then exited.

If an end of frame condition was detected for a packet before reaching the threshold, the end of frame branch is taken from step 107 to step 115. At step 115 the FIFO tinygram list is accessed for a pointer. Step 117 determines is a pointer was available. If none was available, step 119 may be executed to access the FIFO jumbogram list for a pointer. Whether step 119 is used or not depends upon whether the cost of using a grossly oversized location in memory for a packet is considered worth the cost. Step 121 provides for determining if step 119 failed to return a pointer. If no pointer is available, step 123 is executed to flush the frame. Step 123 may be executed following detection of a failure at step 117. A failure acknowledgement may be sent back to the transmitting node.

It at any of steps 111, 117, or 121 it was determined that a pointer was available, step 125 is executed to write the packet from input buffer 31 into memory device 35. For jumbograms, the frame does not reside entirely in the input buffer. When a packet is determined to be a jumbogram, staging of the packet classes and data goes essentially straight to memory. Next, at step 117 the pointer is placed into a receive queue. At step 129 the process for which the packet is destined is notified of it availability.

The program fork following step 129 relates to logical division of processing between control block 33 and a system CPU and DMA controller. Control logic block 33 processing returns to step 105 following step 129. Steps 131, 133 and 135 reflect node response to notification of a process of receipt of a packet. At step 131 the CPU receives the pointer previously stored in the receive queue. Direct memory access controller 61 is then programmed to handle transfer of the packet, typically to system memory. If buffer memory is implemented in system memory this step is omitted. This operation is reflected by step 133. Once the DMA operation is complete, step 135 provides for returning the pointer to the appropriate FIFO jumbogram or tinygram list, indicating that the corresponding locations in memory are now available for reuse.

FIG. 5 is a high level logical flow chart of a process for preparing data packets for transmission. Step 141 provides for any required initialization of the transmission processor. Next, at step 143, the process enters an enforced wait until data becomes available for network transmission. Once a frame is available, the frame is categorized as small or large at step 145. If the frame is small, step 147 is executed to attempt to obtain a pointer to a tinygram location in memory device 37. Otherwise, step 149 is executed to attempt to obtain a pointer to a jumbo location in memory device 37. Following either step, step 151 is executed to determine if a pointer was in fact obtained. If not, step 153 is executed to interrupt the CPU to handle the error. Otherwise, step 155 is executed to perform a direct memory access operation to transfer the data from system memory to memory device 35. Next, step 157 provides for placing the pointer into the transmit queue. The process is an endless loop and is executed until the system is powered down.

Figure 6:
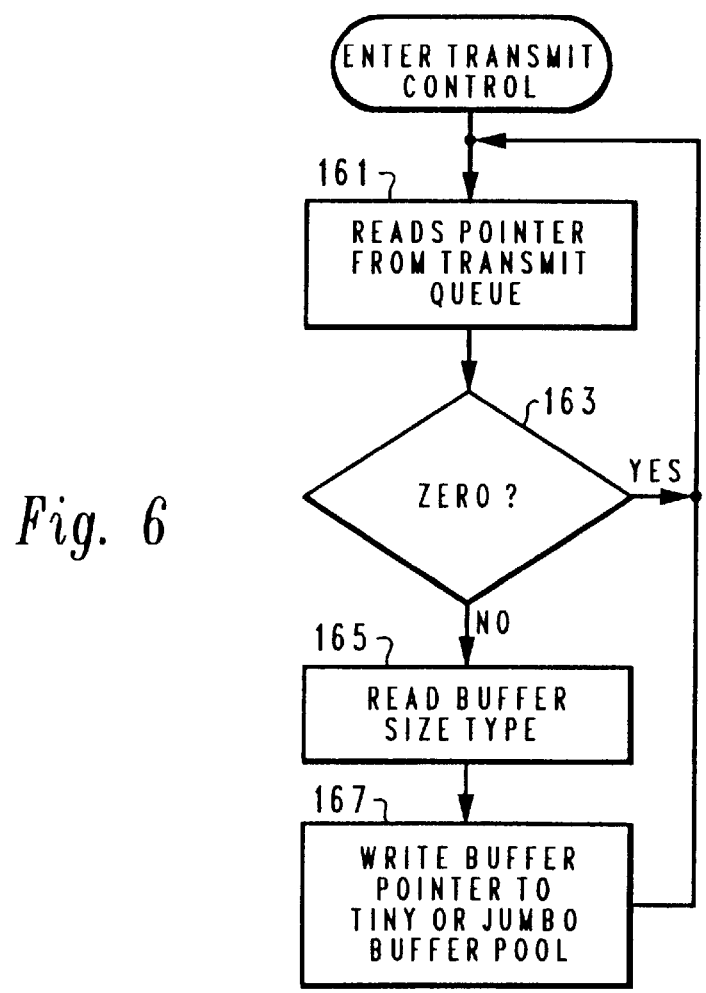
FIG. 6 is a logical flow chart of a process for transmitting packets in accordance with the invention.

FIG. 6 is a high level logical flow chart of a process relating to transmission of tinygrams and jumbograms. The discussion is not intended as a full discussion of the operation of a transmission controller. The process is entered as step 161 where a pointer location is read from the transmit queue. If the pointer value is zero, as determined at step 163, the controller loops back to step 161 to read another location in the queue. It a pointer was present, step 165 is executed to determine the buffer size type. This allows the process to determine the correct queue to which to return the pointer. At step 167 the pointer is returned to the appropriate pool list, 41 or 42 and deleted from the transmit queue. Step 167 may wait upon return of a receipt acknowledgement.

Transmit control block 43 and control block 33 are preferably implemented as logic gates for optimal speed. Compared to a software implemented FIFO input buffer, this implementation reduces memory bandwidth demands by obviating the need for an additional memory move.

The invention allows the large buffer memory of a network adaptor to be used in a manner other than first-in, first-out. Individual management of buffer locations allows for out of order processing of frames. This offers much simpler support of multiple queues. Compared with buffer location chaining, the software and memory bandwidth overheads required are considerably reduced. Compared with fixed buffering schemes the invention reduces internal memory fragmentation. Compared with FIFO buffering with out of sequence memory recovery external fragmentation is substantially reduced.

While the invention has been particularly shown and described with reference to a preferred embodiment, it will be understood by those skilled in the art that various changes in form and detail may be made therein without departing from the spirit and scope of the invention.

What is claimed is:

1. A method of managing a network communications buffer, the method comprising:

dividing a buffer into a plurality of large locations and a plurality of small locations and placing pointers to the locations into a large location first-in, first-out pointer queue or a small location first-in, first-out pointer queue;

receiving a data frame;

detecting an occurrence of an end of data frame condition or of a threshold size condition for the data frame indicating that the length of the data frame exceeds a predetermined threshold;

responsive to occurrence of the threshold size condition, retrieving a pointer from the large location first-in, first-out pointer queue;

responsive to occurrence of the end of frame condition, retrieving a pointer from the small location first-in, first-out pointer queue;

moving the data frame to a location associated with the retrieved pointer;

storing the retrieved pointer in a receive queue; and notifying a process of receipt of the data frame.

2. The method of claim 1, and further comprising;

utilizing the pointer from the receiving queue in a direct memory access operation on the data frame; and after completion of the direct access memory operation, returning the pointer to the large location pointer queue or to the small location pointer queue.

3. The method of claim 2, and further comprising:

after the step of dividing, setting the threshold size condition.

4. The method of claim 3, and further including the steps of:

responsive to a request for transmission of data, retrieving a pointer from the large location pointer queue or the small location pointer queue; and after transmission of a data frame from the location indicated by the retrieved pointer, returning the retrieved pointer to the large location pointer queue or the small location pointer queue.

5. The method of claim 4, wherein the step of retrieving a pointer from the large location pointer queue is also executed if the step of retrieving a pointer from the small location pointer queue fails.

6. The method of claim 5, and further comprising:

responsive to the step of retrieving a pointer from the large location pointer queue failing, flushing the data frame.

7. The method of claim 6, wherein the large location pointer queue is implemented in a first-in, first-out queue and the small location pointer queue is implemented in a first-in, first-out queue.

8. The method of claim 6, wherein the large location pointer queue is implemented in a first linked list stack and the small locator pointer queue is implemented in a second linked list stack.

9. A data processing system comprising:

a transfer buffer within said data processing system comprising a plurality of small locations and a plurality of large locations for holding data frames moving between a communications link and internal logic of a data processing system node;

a list of pointers to the large locations available in the transfer buffer for receiving the data frames;

a list of pointers to the small locations available in the transfer buffer for receiving the data frames;

first means within said data processing system for determining a size category of a received data frame;

second means coupled to said first means and responsive to a determination of a size category for the received data frame for retrieving a pointer from either the list of pointers to the small locations or the list of pointers to the large locations; and third means coupled to said second means for storing the received data frame in a location of the transfer buffer corresponding to the retrieved pointer.

10. The data processing system of claim 9, and further comprising:

a receive queue for storing the retrieved pointer.

11. The data processing system of claim 10, wherein the internal logic includes:

a system memory;

a direct memory access controller for utilizing the pointer in the receive queue for transferring the data frame from the transfer buffer to the system memory;

a central processing unit for programming the direct memory access controller with the retrieved pointer from the receive queue and returning the retrieved pointer upon completion of transfer of the data frame to either the list of pointers to the small locations or to the list of pointers to the large locations.

12. The data processing system of claim 11, wherein the means for determining a size category of a received data frame comprises:

means for establishing a threshold for categorizing a data frame as large;

means for detecting an end of data frame condition prior to reaching the threshold and for categorizing a data frame as small; and means for otherwise categorizing the data frame as large.

13. The data processing system of claim 11, and further comprising:

means for generating a data frame for transmission;

means for categorizing the data frame for transmission as large or small;

means responsive to a determination of a size category for the data frame for transmission for retrieving a pointer from either the list of pointers to small locations or the list of pointers to large locations;

means for storing the data frame for transmission at a location in the transfer buffer corresponding to the pointer;

a transmission queue for receiving the pointer retrieved for the data frame for transmission;

a processor for utilizing the pointer retrieved for the data frame for transmission for controlling transmission over the communications link of the data frame and returning the pointer retrieved for the data frame for transmission to either the list of pointers to the small locations or to the list of pointers to the large locations.

14. A method of managing communication data organized into packets, the method comprising:

dividing a memory device into pools including a plurality of tinygram contiguous sections and a plurality of jumbogram contiguous sections;

setting a threshold for distinguishing the packets as tinygrams and jumbograms;

listing tinygram contiguous sections available for storage of packets in a list of pointers to the available tinygram contiguous sections;

listing jumbogram contiguous sections available for storage of packets in a list of pointers to the available jumbogram contiguous sections;

measuring packets against the threshold upon receipt of the packets;

responsive to an occurrence of an end of packet condition prior to reaching the threshold, storing the packet in a tinygram contiguous section by:

retrieving a pointer from the list of pointers to the available tinygram contiguous sections;

writing the packet into a location in the memory device corresponding to the pointer;

placing the pointer into a receive queue; and otherwise, storing the packet in a jumbogram contiguous section.

15. The method of claim 14, wherein storing the packet in a jumbogram contiguous section includes:

retrieving a pointer from the list of pointers to the available jumbogram contiguous sections;

writing the packet into a location in the memory device corresponding to the pointer; and placing the pointer into a receive queue.

16. The method of claim 14 wherein packets are part of communications traffic and exhibit at least two distinct peaks in frequency as a function of packet size.

17. The method of claim 14, and further comprising:

upon storage of a packet in the memory device, retrieving a pointer from one the lists of pointers and placing the pointer in a transmit queue.

* * * * *